(12) United States Patent
Kukita et al.

(10) Patent No.: US 11,773,632 B2
(45) Date of Patent: Oct. 3, 2023

(54) VEHICULAR DOOR OUTER HANDLE DEVICE

(71) Applicant: KABUSHIKI KAISHA HONDA LOCK, Miyazaki (JP)

(72) Inventors: Tomoyuki Kukita, Miyazaki (JP); Takahiro Yamada, Miyazaki (JP)

(73) Assignee: MINEBEA ACCESSSOLUTIONS INC., Miyazaki (JP)

( * ) Notice: Subject to any disclaimer, the term of this patent is extended or adjusted under 35 U.S.C. 154(b) by 446 days.

(21) Appl. No.: 17/256,700

(22) PCT Filed: Jul. 3, 2019

(86) PCT No.: PCT/JP2019/026455
§ 371 (c)(1),
(2) Date: Dec. 29, 2020

(87) PCT Pub. No.: WO2020/031563
PCT Pub. Date: Feb. 13, 2020

(65) Prior Publication Data
US 2021/0363796 A1 Nov. 25, 2021

(30) Foreign Application Priority Data
Aug. 7, 2018 (JP) .................. 2018-148362

(51) Int. Cl.
*B60J 5/04* (2006.01)
*E05B 79/06* (2014.01)
*E05B 85/16* (2014.01)

(52) U.S. Cl.
CPC ............ *E05B 85/16* (2013.01); *B60J 5/0412* (2013.01); *E05B 79/06* (2013.01)

(58) Field of Classification Search
CPC .......... E05B 85/16; E05B 79/06; B60J 5/0412
See application file for complete search history.

(56) References Cited

U.S. PATENT DOCUMENTS

| 8,959,964 B2 * | 2/2015 | Hidaka | .................. E05B 85/16 |
| | | | 292/DIG. 31 |
| 2003/0001399 A1 | 1/2003 | Sato | |
| 2015/0061305 A1 | 3/2015 | Inai et al. | |

FOREIGN PATENT DOCUMENTS

| CN | 1984721 A | 6/2007 |
| CN | 104417327 A | 3/2015 |

(Continued)

OTHER PUBLICATIONS

International Search Report (ISR) dated Sep. 3, 2019 filed in PCT/JP2019/026455.

(Continued)

*Primary Examiner* — Kristina R Fulton
*Assistant Examiner* — Thomas L Neubauer
(74) *Attorney, Agent, or Firm* — Rankin, Hill & Clark LLP (57) ABSTRACT

In a vehicular door outer handle device, when a handle base, to which a handle lever that is interlocked with and connected to a connecting arm portion of an outer handle is assembled, is assembled to a vehicle door, insertion of the handle lever into an opening of the vehicle door is allowed when the handle lever is in an operating position. In the vehicle door outer handle device, a state of holding the handle lever in the operating position is reliably maintained so that the handle lever is placed in the operating position. A return spring 35, that causes a first engaging portion 35b to be in contact with and engaged with a handle lever 36, is attached to the handle lever 36 so as to be able to switch between a state in which when a handle base 25 is assembled to the vehicle door, in a temporary holding state in which a connecting arm portion 16 is placed in a door opening operation position, a second engaging portion 35c is not engaged with the handle base 25, and a state in which after assembly of the handle base 25 to the vehicle door is (Continued)

completed, the second engaging portion 35*c* is in contact with and engaged with the handle base 25.

2 Claims, 8 Drawing Sheets

(56) References Cited

FOREIGN PATENT DOCUMENTS

| CN | 206801275 U | 12/2017 |
|----|-------------|---------|
| EP | 0646688 A1 | 4/1995 |
| JP | 2001-227206 A | 8/2001 |
| JP | 3794291 B2 | 7/2006 |
| JP | 5934159 B2 | 6/2016 |

OTHER PUBLICATIONS

Chinese Office Action (CNOA) dated Jul. 1, 2021 for the corresponding Chinese Patent Application No. 201980040135.1. and its English trasnlation.

\* cited by examiner

VEHICULAR DOOR OUTER HANDLE DEVICE

TECHNICAL FIELD

This application claims priority based on Japanese Patent Application "No. 2018-148362" filed on Aug. 7, 2018 and incorporates its contents by reference.

The present invention relates to a vehicular door outer handle device. In the vehicular door outer handle device, an opening is provided in an outer panel of a vehicle door, a handle base having an insertion hole is fixed to the vehicle door so as to close the opening, while a part of the handle base is inserted into the outer panel from the opening, a connecting arm portion provided on an outer handle that allows a door opening operation on the outside of the outer panel is inserted into the insertion hole of the handle base so as to be able to move between a non-operation position in a non-operation state of the outer handle and a door opening operation position in a door opening operation completed state of the outer handle, a handle lever that is interlocked with and connected to the connecting arm portion is supported by the handle base so that it can rotate between a non-operating position corresponding to the non-operation position of the connecting arm portion and an operating position corresponding to the door opening operation position of the connecting arm portion, a return spring, that is interposed between the handle base and the handle lever and elastically urges the handle lever toward the non-operating position, is attached to the handle lever, and when the handle base, to which the handle lever that is interlocked with and connected to the connecting arm portion is assembled, is assembled to the vehicle door, insertion of the handle lever into the opening is not allowed in a state of the non-operating position, but is allowed in a state of the operating position.

BACKGROUND ART

When assembling the outer handle to the vehicle door, the handle base, to which the handle lever that is interlocked with and connected to the connecting arm portion of the outer handle is assembled, is fixed to the outer panel. However, the handle lever in the non-operating position cannot be inserted into the opening provided in the outer panel. By performing the door opening operation of the outer handle and placing the handle lever in the operating position, the handle lever can be inserted into the opening. Therefore, conventionally, an operator has performed an assembly work while maintaining the door opening operation position of the outer handle. However, the operation is complicated. In order to solve this problem, in what is known by PATENT LITERATURE 1, the connecting arm portion of the outer handle is engaged with the handle base in a door opening operation state of the outer handle.

CITATION LIST

Patent Literature

PATENT LITERATURE 1: Japanese Patent No. 3794291

SUMMARY OF INVENTION

Problems to be Solved by the Invention

By the way, in the one disclosed in PATENT LITERATURE 1, the handle lever is held in the operating position by an engagement between the connecting arm portion of the outer handle and the handle base. However, the outer handle is susceptible to impact, and the connecting arm portion and the handle base may be disengaged due to a slight impact or the assembly work of the operator. Further, for the purpose of facilitating the assembly work, it is also conceivable to carry out transportation while temporarily holding the outer handle in the door opening operation state so that the handle lever is placed in the operating position. Also in this case, in an engagement structure disclosed in PATENT LITERATURE 1, the engagement may be disengaged due to vibration during the transportation.

The present invention has been made in view of such circumstances. An object of the present invention is to provide the following vehicular door outer handle device. In the vehicular door outer handle device, a state of holding the outer handle in the door opening operation position can be maintained so that the handle lever is placed in the operating position.

Solution to the Problems

In order to achieve the object mentioned above, a first feature of the present invention is a vehicular door outer handle device that is configured such that: an opening is provided in an outer panel of a vehicle door; a handle base having an insertion hole is fixed to the vehicle door so as to close the opening, while a part of the handle base is inserted into the outer panel from the opening; a connecting arm portion provided on an outer handle that allows a door opening operation on the outside of the outer panel is inserted into the insertion hole of the handle base so as to be able to move between a non-operation position in a non-operation state of the outer handle and a door opening operation position in a door opening operation completed state of the outer handle; a handle lever that is interlocked with and connected to the connecting arm portion is supported by the handle base so that the handle lever can rotate between a non-operating position corresponding to the non-operation position of the connecting arm portion and an operating position corresponding to the door opening operation position of the connecting arm portion; a return spring, that is interposed between the handle base and the handle lever and elastically urges the handle lever toward the non-operating position, is attached to the handle lever; and when the handle base, to which the handle lever that is interlocked with and connected to the connecting arm portion is assembled, is assembled to the vehicle door, insertion of the handle lever into the opening is not allowed in a state of the non-operating position, but is allowed in a state of the operating position, wherein the return spring, that has a first engaging portion and a second engaging portion at both ends of the return spring and causes the first engaging portion to be in contact with and engaged with the handle lever, is attached to the handle lever so as to be able to switch between a state in which when the handle base is assembled to the vehicle door, in a temporary holding state in which the connecting arm portion inserted into the opening is placed in the door opening operation position, the second engaging portion is not engaged with the handle lever, and a state in which after assembly of the handle base to the vehicle door is completed, the second engaging portion is in contact with and engaged with the handle base.

In addition to the configuration of the first feature, a second feature of the present invention is that: the handle lever is provided with a cylindrical support tube portion through which a support shaft that rotatably supports the handle lever on the handle base is inserted; the return spring is a torsion spring having a coil portion that surrounds the support tube portion, a first engaging portion that is provided at one end of the coil portion and is in contact with and engaged with the handle lever, and a second engaging portion, that can be in contact with and engaged with a spring locking portion provided on the handle base, and is provided at the other end of the coil portion; a pressing contact portion, that can be in contact with the second engaging portion not engaged with the spring locking portion, is provided in the connecting arm portion so as to be able to press the second engaging portion toward the spring locking portion in response to movement of the connecting arm portion from the door opening operation position to the non-operation position; and the handle base is provided with a cam portion that guides the second engaging portion toward the spring locking portion in association with the movement of the connecting arm portion from the door opening operation position to the non-operation position.

Effects of Invention

According to a first feature of the present invention, before assembling the handle base, to which the handle lever that is interlocked with and connected to the connecting arm portion inserted into the insertion hole of the handle base is assembled, to the vehicle door, while the second engaging portion of the return spring, that is in a state in which the first engaging portion is engaged with the handle lever, is not engaged with the spring locking portion of the handle base, by obtaining the temporary holding state in which the connecting arm portion is placed in the door opening operation position, the handle lever in a state in which a spring force of the return spring does not act can be moved to the operating position to easily insert the handle lever into the opening of the outer panel, and the work of assembling the outer handle to the vehicle door can be easy. Further, since the outer handle itself, that is susceptible to the impact, is not engaged, the temporary holding state is not easily released. Furthermore, no dedicated parts are required for temporarily holding the handle lever, and an increase in the number of parts can be avoided.

Further, according to a second feature of the present invention, when the second engaging portion of the return spring is in an unengaged state with the spring locking portion, by moving the connecting arm portion from the door opening operation position to the non-operation position, the pressing contact portion of the connecting arm portion contacts the second engaging portion and presses the second engaging portion toward the spring locking portion of the handle base. At that time, the second engaging portion is guided toward the spring locking portion by the cam portion provided on the handle base. Thus, the second engaging portion can be brought into contact with and engaged with the spring locking portion simply by moving the connecting arm portion from the door opening operation position to the non-operation position. Therefore, the work of contacting and engaging the second engaging portion with the spring locking portion is easy. Further, even if the connecting arm portion is slightly pushed from the door opening operation position toward the non-operation position by the impact or the vibration during the transportation, unless the connecting arm portion moves to the non-operation position, the second engaging portion of the return spring is engaged with the spring locking portion of the handle base, and the handle lever does not rotate to the non-operating position. Therefore, a possibility that the temporary holding state of holding the handle lever in the operating position side is released can be suppressed to a low level.

DESCRIPTION OF EMBODIMENTS

Hereinafter, embodiments of the present invention will be described with reference to accompanying FIGS. 1 to 9. First, in FIGS. 1 and 2, for example, an outer handle 12 extending in a vehicle front-rear direction (left-right direction in FIG. 1) is rotatably attached to an outer panel 11 of a vehicle door D that is a side door so that it can be operated at an outer surface side of the vehicle door D. The outer panel 11 is provided with a curved portion 11a forming a recess 13 so as to bulge inward in a vehicle width direction. The recess 13 is provided to allow a vehicle user's hand to be inserted to grip the outer handle 12 on an outside of the outer panel 11.

Figure 1:
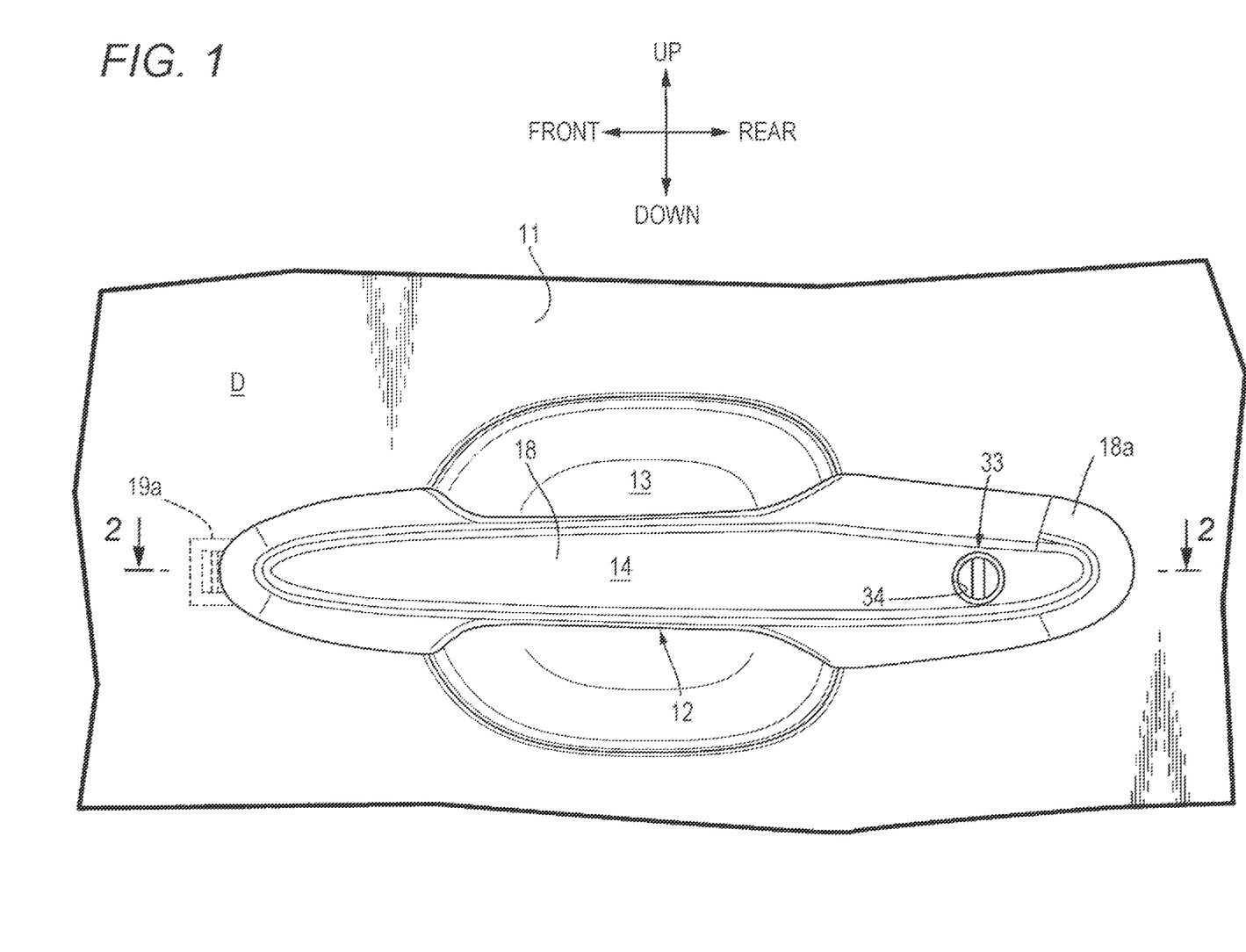
FIG. 1 is a side view illustrating a part of a vehicle door.
Figure 2:
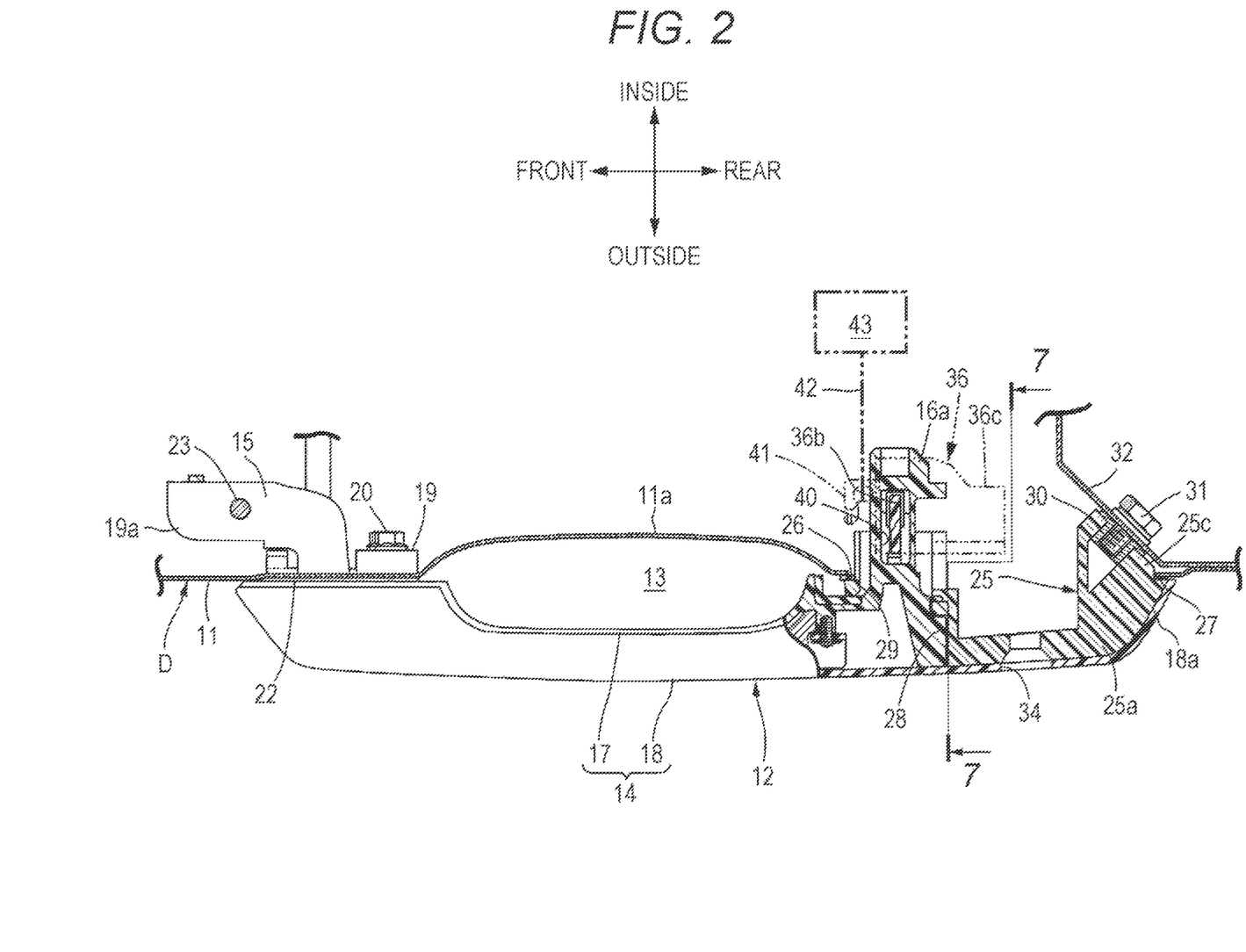
FIG. 2 is a cross-sectional view taken along a line 2-2 of FIG. 1 when an outer handle is in a non-operation position.

The outer handle 12 has a handle body 14, a substantially L-shaped support arm portion 15, and a connecting arm portion 16. The handle body 14 is disposed to extend in the vehicle front-rear direction on the outside of the outer panel 11. The support arm portion 15 is continuously provided at a front end portion in the vehicle front-rear direction of the handle body 14. The connecting arm portion 16 is continuously provided near the other end of the handle body 14. The handle body 14 includes a handle body main portion 17 and a handle cover 18. The handle body main portion 17 has a substantially U-shaped cross-sectional shape that is open to a side opposite to the outer panel 11, and the handle cover 18 covers the handle body main portion 17 from the side opposite to the outer panel 11. The support arm portion 15 and the connecting arm portion 16 are integrally provided with the handle body main portion 17. Further, the handle cover 18 is formed to have a protruding portion 18a extending further rearward from a rear end portion of the handle body main portion 17.

A support member 19 disposed in front of the curved portion 11a in the vehicle front-rear direction is fastened to an inner surface of the outer panel 11 by a bolt 20 and a nut (not shown). A thin plate-like first sheet member 22 is attached to the front end portion of the handle body main portion 17 of the handle body 14, the first sheet member 22 being interposed between the front end portion and an outer surface of the outer panel 11. Further, the support member 19 is integrally provided with a handle support portion 19a that is bent in a substantially L-shape inside the outer panel 11. The support arm portion 15 penetrates the first sheet member 22 and the outer panel 11 and is inserted inside the outer panel 11. The support arm portion 15 is rotatably supported by the handle support portion 19a via a support pin 23.

A handle base 25 that sandwiches the curved portion 11a with the support member 19 is fixed to the vehicle door D. While a part of the handle base 25 is inserted into the outer panel 11 from an opening 26 provided in the outer panel 11, the handle base 25 closes the opening 26 and is fixed to the vehicle door D. The handle base 25 is formed to integrally have a base main portion 25a, a guide portion 25b, and an attached portion 25c. The base main portion 25a is disposed outside the outer panel 11. The guide portion 25b extends inward of the outer panel 11 from the base main portion 25a so as to guide the connecting arm portion 16 of the outer handle 12. The attached portion 25c extends inward of the outer panel 11 from a rear portion of the base main portion 25a. The base main portion 25a is covered with the protruding portion 18a of the handle cover 18 in the handle body 14 when the outer handle 12 is in a non-operation position, the protruding portion 18a extending rearward from the handle body main portion 17. Further, a thin plate-like second sheet member 27 surrounding the opening 26 is interposed between the base main portion 25a and the outer surface of the outer panel 11.

A receiving recess 28 for receiving the rear end portion of the handle body main portion 17 in the handle body 14 is provided in an end portion on the recess 13 side of the base main portion 25a. A rectangular insertion hole 29 into which the connecting arm portion 16 is inserted is formed in the receiving recess 28. The guide portion 25b is continuous with the insertion hole 29 and is formed in a rectangular tubular shape.

A nut 30 is press-fitted into the attached portion 25c. A bolt 31 screwed into the nut 30 is inserted through an end wall 32 on the rear end side of the vehicle door D. By tightening the bolt 31, the handle base 25 is fixed to the vehicle door D.

Behind the connecting arm portion 16, a cylinder body (not shown) of a cylinder lock 33 (see FIG. 1), in which locking and unlocking operations are performed by a mechanical key (not shown), is fixed to the handle base 25. A through-hole 34 facing the cylinder lock 33 is formed in the protruding portion 18a of the handle cover 18 in the handle body 14 of the outer handle 12.

Figure 3:
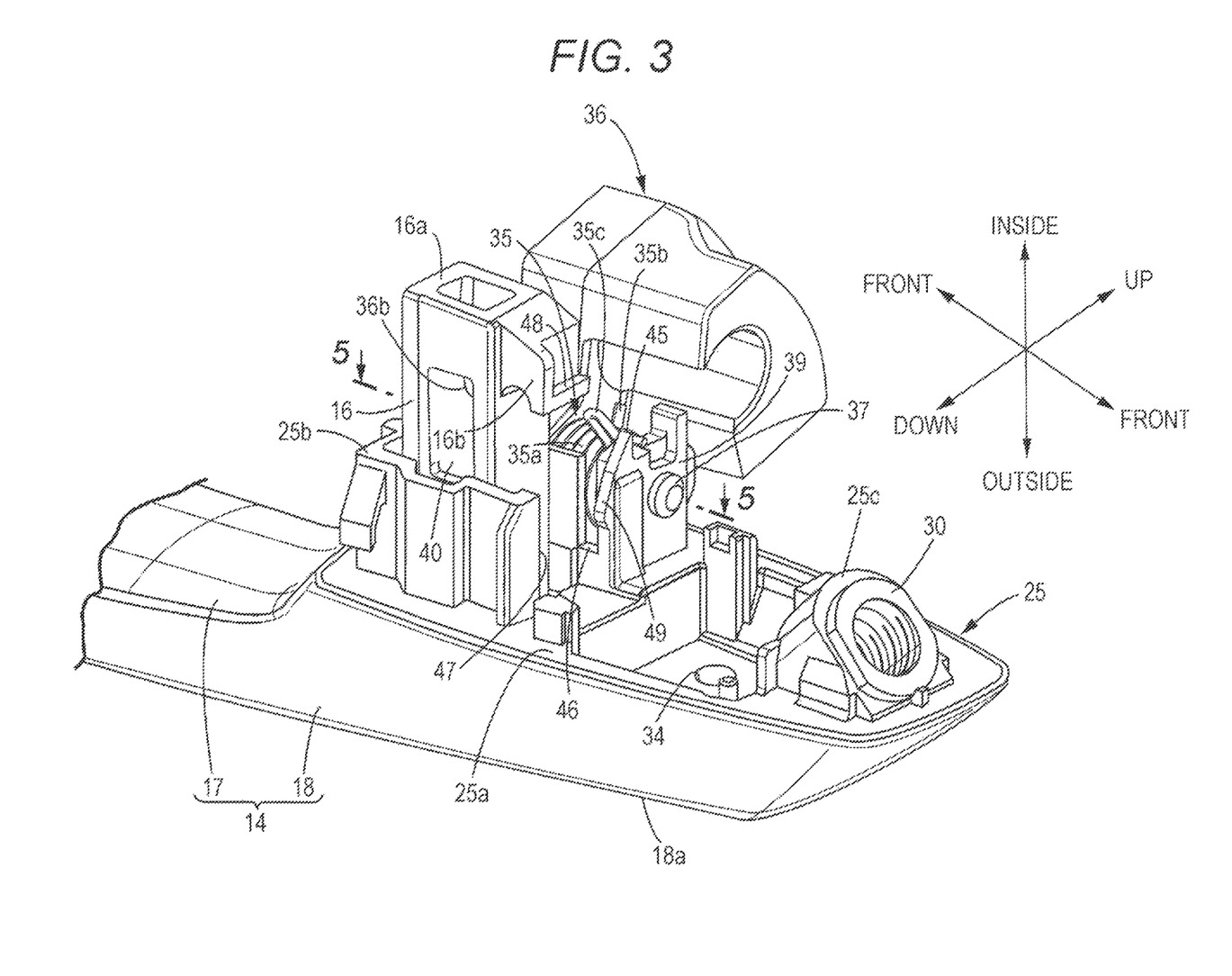
FIG. 3 is a perspective view illustrating a part of the outer handle and a handle base from below on the outer panel side, in a state in which a connecting arm portion is in the non-operation position.
Figure 4:
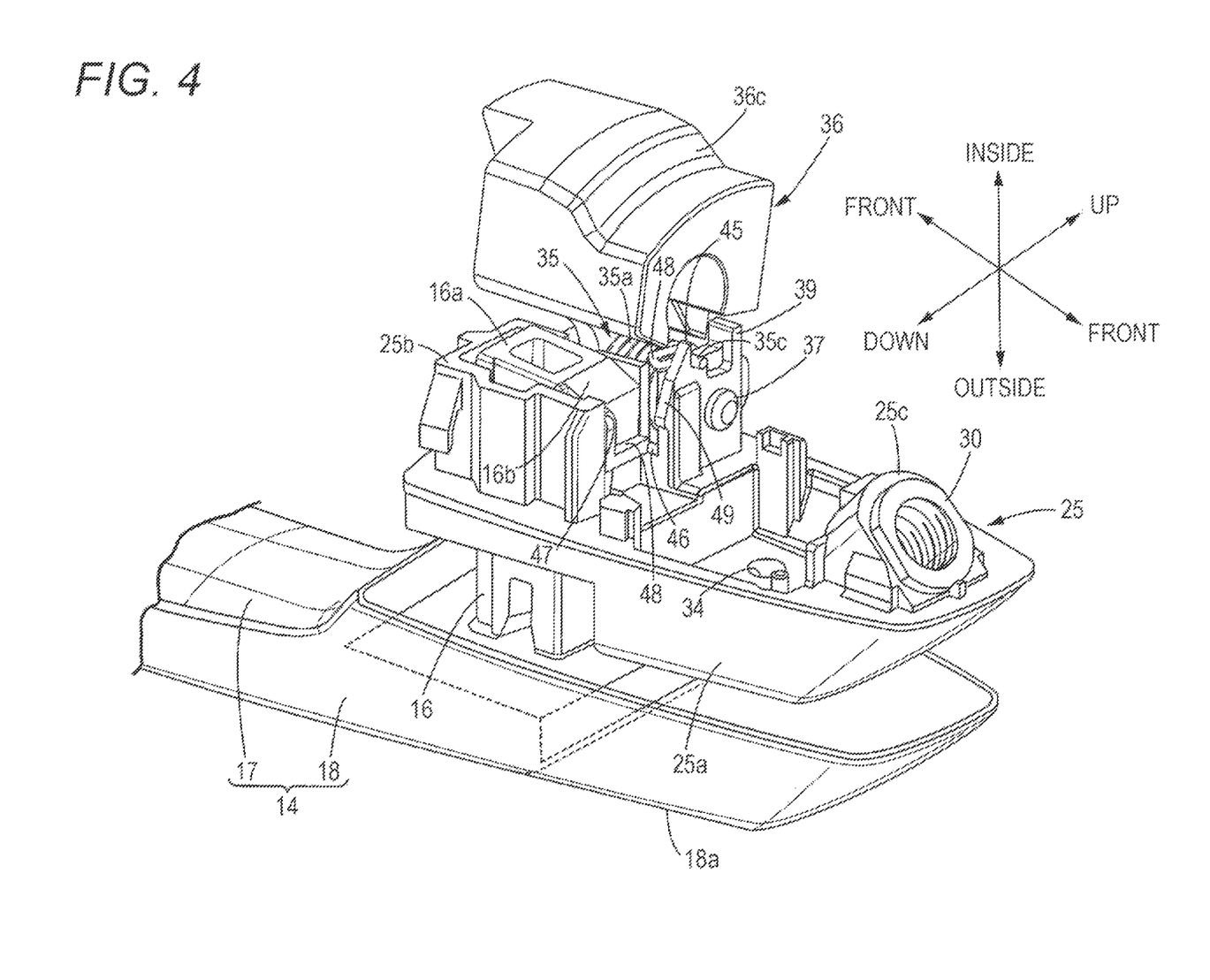
FIG. 4 is a perspective view illustrating a part of the outer handle and the handle base from below on the outer panel side, in a state in which the connecting arm portion is in a door opening operation position.

With reference to FIGS. 3 and 4, the connecting arm portion 16 is inserted into the insertion hole 29 so that it can be moved between the non-operation position (position shown in FIGS. 2 and 3) in a non-operation state of the outer handle 12 and a door opening operation position (position shown in FIG. 4) in a door opening operation completed state of the outer handle 12. A handle lever 36, which can rotate between a non-operating position (position shown in FIG. 3) corresponding to the non-operation position of the connecting arm portion 16 and an operation position (position shown in FIG. 4) corresponding to the door opening operation position of the connecting arm portion 16, is interlocked with and connected to the connecting arm portion 16, and is supported by the handle base 25 while being elastically urged toward the non-operating position.

Figure 5:
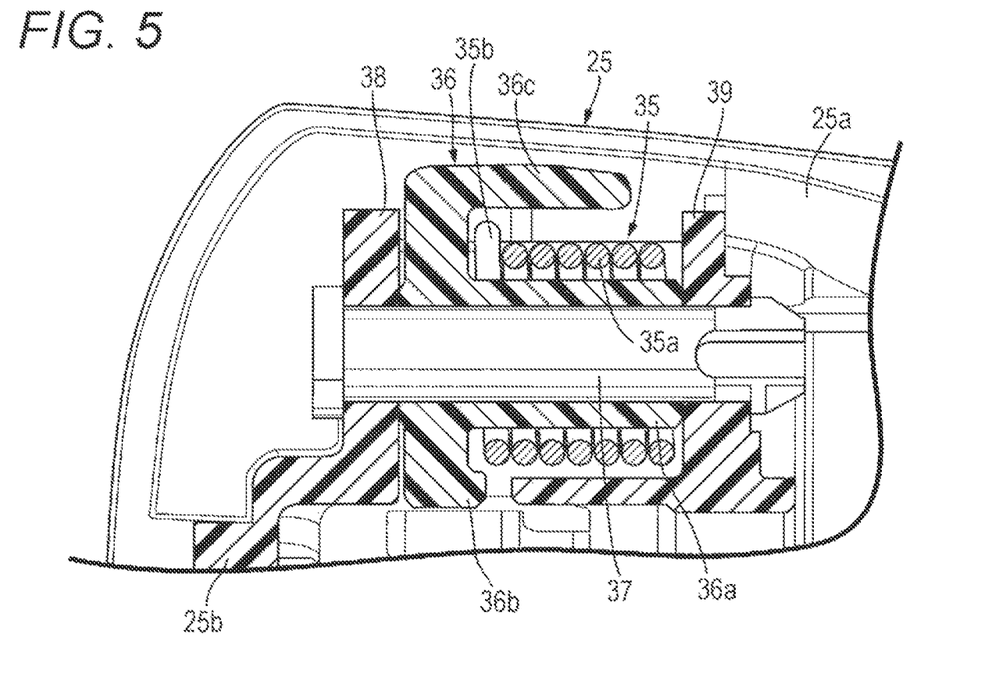
FIG. 5 is a cross-sectional view taken along a line 5-5 of FIG. 3.

Also with reference to FIG. 5, the handle lever 36 is supported by the handle base 25 via a support shaft 37 having an axis in a longitudinal direction of the handle body 14. The support shaft 37 is provided across first and second support walls 38 and 39. The first and second support walls 38 and 39 are spaced apart in the longitudinal direction of the handle body 14 and integrally provided with the handle base 25 above the connecting arm portion 16.

The handle lever 36 is formed to integrally have a cylindrical support tube portion 36a, a flat plate-like engaging arm portion 36b, and a weight portion 36c. The support tube portion 36a is disposed between the first and second support walls 38 and 39. The support shaft 37 is inserted through the support tube portion 36a. The engaging arm portion 36b is continuously provided in a portion near the first support wall 38 of the support tube portion 36a, and projects radially outward from the support tube portion 36a. The weight portion 36c is continuously provided with the engaging arm portion 36b. A return spring 35 is attached to the handle lever 36. The return spring 35 is interposed between the handle base 25 and the handle lever 36 to elastically urge the handle lever 36 toward the non-operating position.

Connecting holes 40 are formed in the connecting arm portion 16 of the outer handle 12. The connecting holes 40 are opened on both the upper and lower sides of the connecting arm portion 16. In the connecting hole 40, an end portion on a side opposite to the handle body 14 is closed at a tip side end wall 16a of the connecting arm portion 16. The engaging arm portion 36b of the handle lever 36 is inserted into the connecting hole 40. Further, the guide portion 25b having a rectangular tubular shape is formed so that a tip portion of the engaging arm portion 36b can be inserted into the connecting hole 40.

In the connecting hole 40, the tip portion of the engaging arm portion 36b is in contact with the tip side end wall 16a. In response to movement of the connecting arm portion 16 between the non-operation position and the door opening operation position in association with a rotation of the outer handle 12, the handle lever 36 rotates between the non-operating position and the operating position.

Focusing on FIG. 2, a bush joint 41 made of an elastic material is elastically fitted into the weight portion 36c of the handle lever 36 so as to be able to rotate around an axis parallel to the axis of the support shaft 37. The other end of a rod 42, one end of which is connected to the bush joint 41, is connected to a latch mechanism 43 provided in the vehicle door D. That is, when the handle lever 36 rotates from the non-operating position to the operating position, a pressing force from the rod 42 is input to the latch mechanism 43.

When the latch mechanism 43 confirms the vehicle user's intention to lock the vehicle door D, the latch mechanism 43 holds the vehicle door D in a locked state in a state in which it is confirmed that a portable device is a qualified portable device by communication between the portable device carried by the vehicle user and the vehicle. Further, when the latch mechanism 43 confirms the vehicle user's intention to unlock the vehicle door D based on the vehicle user gripping the handle body 14 in the locked state of the vehicle door D, the latch mechanism 43 releases the locked state of the vehicle door D in the state in which it is confirmed that the portable device is the qualified portable device by communication between the portable device carried by the vehicle user and the vehicle. The latch mechanism 43 can open the vehicle door D as the pressing force from the rod 42 is input to the latch mechanism 43 in its unlocked state.

Figure 6:
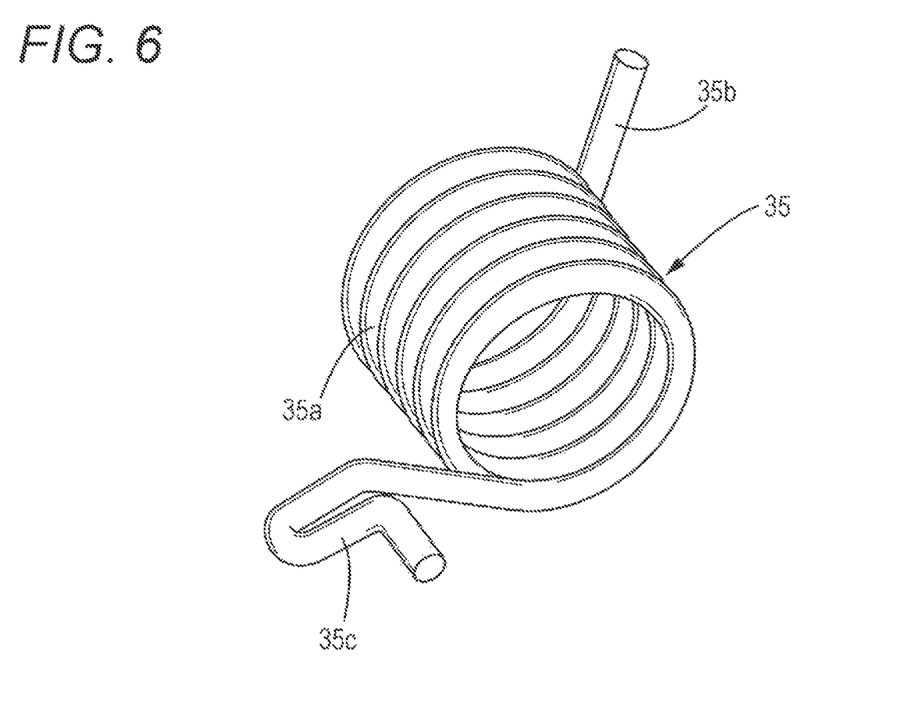
FIG. 6 is a perspective view of a return spring.

Also with reference to FIG. 6, the return spring 35 is a torsion spring having a coil portion 35a, a first engaging portion 35b, and a second engaging portion 35c. The coil portion 35a surrounds the support tube portion 36a of the handle lever 36. The first engaging portion 35b is provided at one end of the coil portion 35a, and is in contact with and engaged with the handle lever 36. The second engaging portion 35c is provided at the other end of the coil portion 35a so that it can be in contact with and engaged with a spring locking portion 45 provided on the handle base 25. The return spring 35 is attached to the handle lever 36 by fitting the coil portion 35a into the support tube portion 36a.

Figure 7:
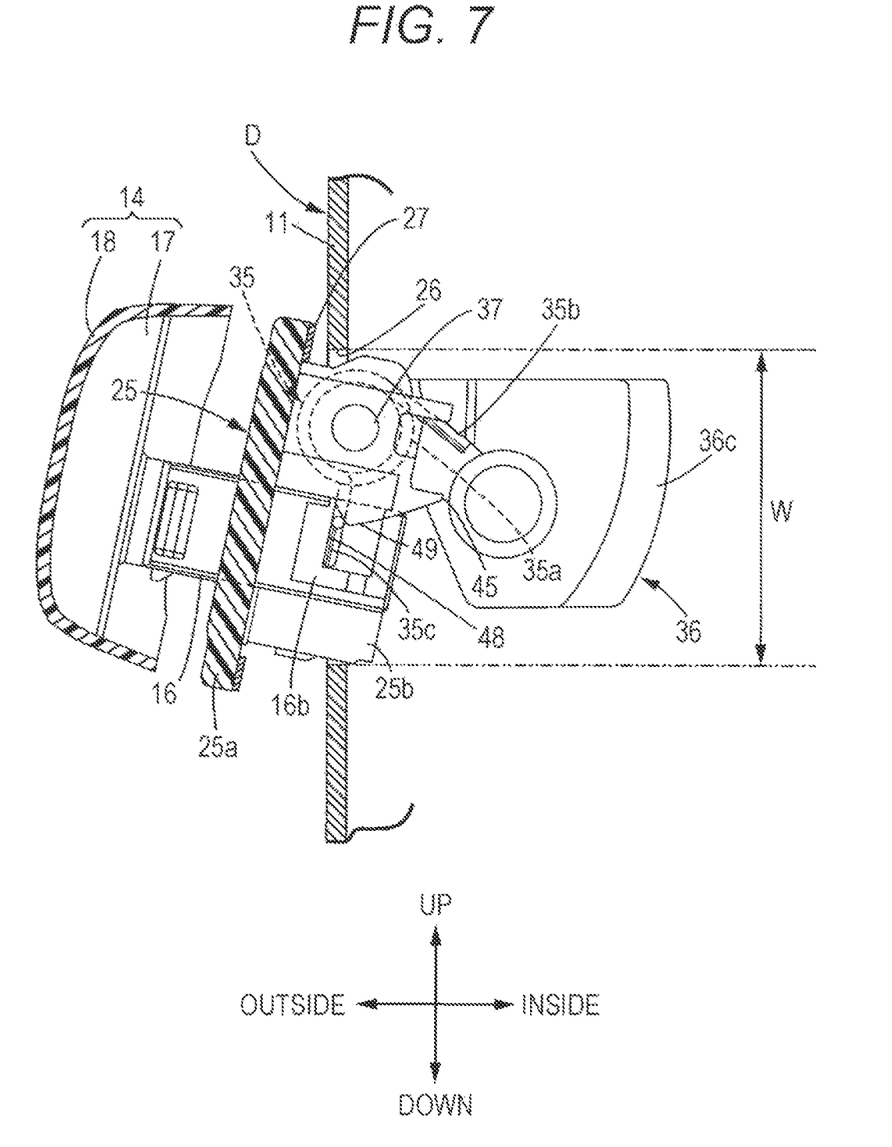
FIG. 7 is a cross-sectional view taken along a line 7-7 of FIG. 2 to illustrate a state in which the handle lever in the non-operating position is inserted into an opening of the outer panel.

By the way, when the handle lever 36 is in the non-operating position, the weight portion 36c of the handle lever 36 is in a state of projecting upward above an upper edge of the opening 26 of the outer panel 11. In this state, when the handle base 25, to which the handle lever 36 that is interlocked with and connected to the connecting arm portion 16 of the outer handle 12 is assembled, is assembled to the vehicle door D, the handle lever 36 cannot be inserted through the opening 26 as it is. On the other hand, when the handle lever 36 is in the operating position, a part of the weight portion 36c of the handle lever 36 is in a state of slightly projecting upward above the upper edge of the opening 26 of the outer panel 11. In this state, by slightly tilting the handle base 25 as illustrated in FIG. 7, the weight portion 36c of the handle lever 36 is disposed within a width in an up-down direction of the opening 26, so that the handle lever 36 can be inserted into the opening 26. That is, when the handle base 25, to which the handle lever 36 that is interlocked with and connected to the connecting arm portion 16 of the outer handle 12 is assembled, is assembled to the vehicle door D, the handle lever 36 is allowed to be inserted into the opening 26 when the handle lever 36 is in the operating position.

Therefore, the return spring 35, that is a return spring configured to have the first engaging portion 35b and the second engaging portion 35c at both ends thereof and causes the first engaging portion 35b to be in contact with and engaged with the handle lever 36, is attached to the handle lever 36 so as to be able to switch between a temporary holding state in which the second engaging portion 35c is not engaged with the spring locking portion 45 of the handle base 25, while the connecting arm portion 16 inserted into the opening 26 is placed in the door opening operation position and the handle lever 36 is temporarily placed in the operating position, when the handle base 25 is assembled to the vehicle door D, and a state in which the second engaging portion 35c is in contact with and engaged with the spring locking portion 45 of the handle base 25 after assembly of the handle base 25 to the vehicle door D is completed.

Figure 8:
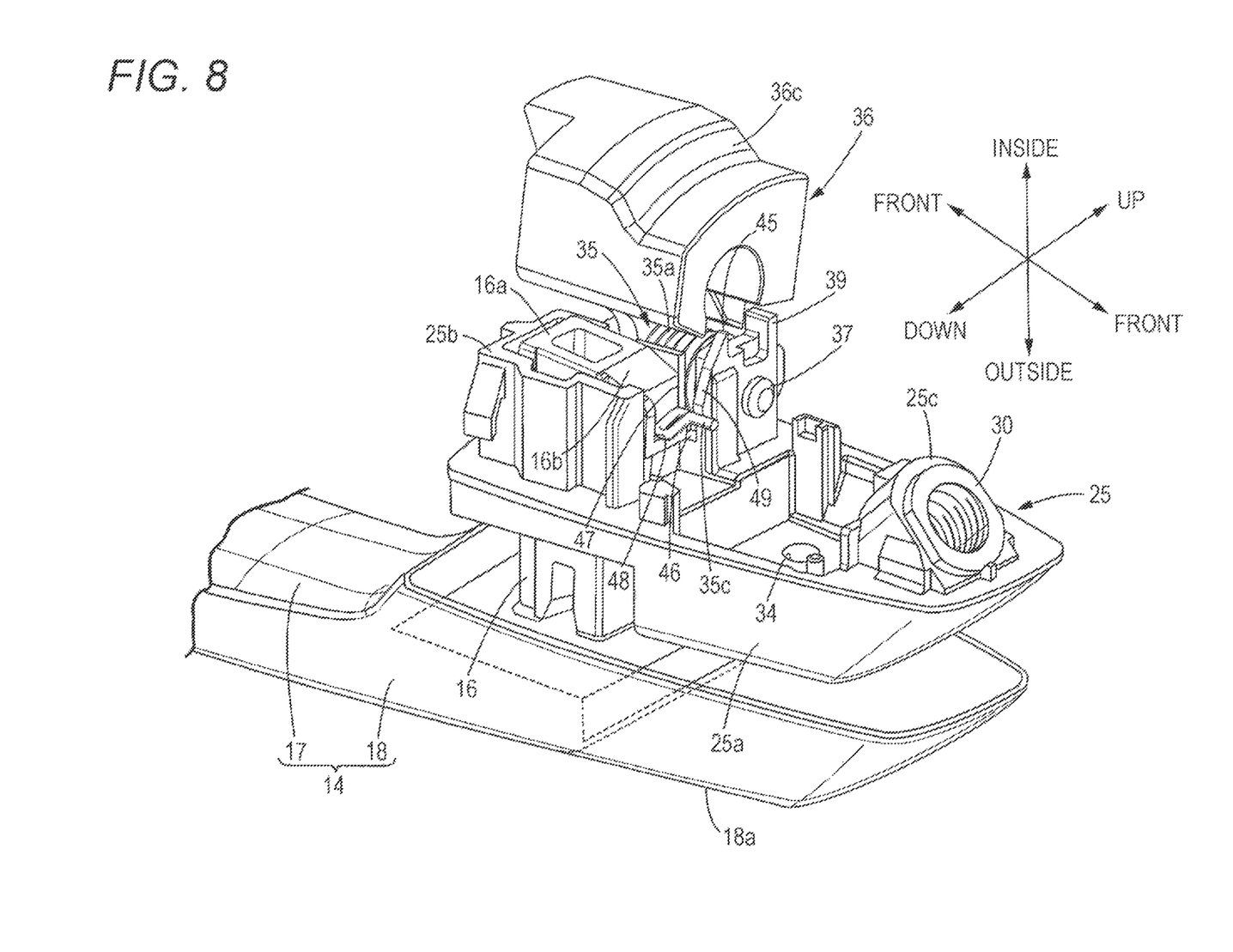
FIG. 8 is a perspective view corresponding to FIGS. 3 and 4 in a state in which the connecting arm portion is in the door opening operation position and the second engaging portion of the return spring is not engaged with the spring locking portion.

Also with reference to FIG. 8, the spring locking portion 45 is provided at a lower tip of the second support wall 39. Further, when the second engaging portion 35c of the return spring 35 is not engaged with the spring locking portion 45, the second engaging portion 35c is located at a position projecting from the second support wall 39 toward the guide portion 25b of the handle base 25. Between the second support wall 39 and the guide portion 25b, a slit 46 for projecting the second engaging portion 35c toward the guide portion 25b is formed to extend in a moving direction of the connecting arm portion 16.

On the other hand, a protrusion 16b projecting rearward in the vehicle front-rear direction is integrally provided projected on the tip side end wall 16a of the connecting arm portion 16. A guide hole 47 that guides the protrusion 16b so as to allow the protrusion 16b to move along with the connecting arm portion 16 extends long in the moving direction of the connecting arm portion 16, to be formed at a rear portion of the guide portion 25b. Moreover, the protrusion 16b is provided with a pressing contact portion 48. The pressing contact portion 48 comes into contact with the second engaging portion 35c, that projects from the slit 46 toward the guide portion 25b, from a side opposite to the spring locking portion 45.

That is, when the second engaging portion 35c of the return spring 35 is not engaged with the spring locking portion 45, as the connecting arm portion 16 moves from the door opening operation position to the non-operation position, the pressing contact portion 48 comes into contact with the second engaging portion 35c, to press the second engaging portion 35c toward the spring locking portion 45.

A cam portion 49 is provided to have a chevron shape and be continuous to the spring locking portion 45, on a side edge on the guide portion 25b side of the second support wall 39. The cam portion 49 guides the second engaging portion 35c toward the spring locking portion 45 in association with the movement of the connecting arm portion 16 from the door opening operation position to the non-operation position.

Figure 9:
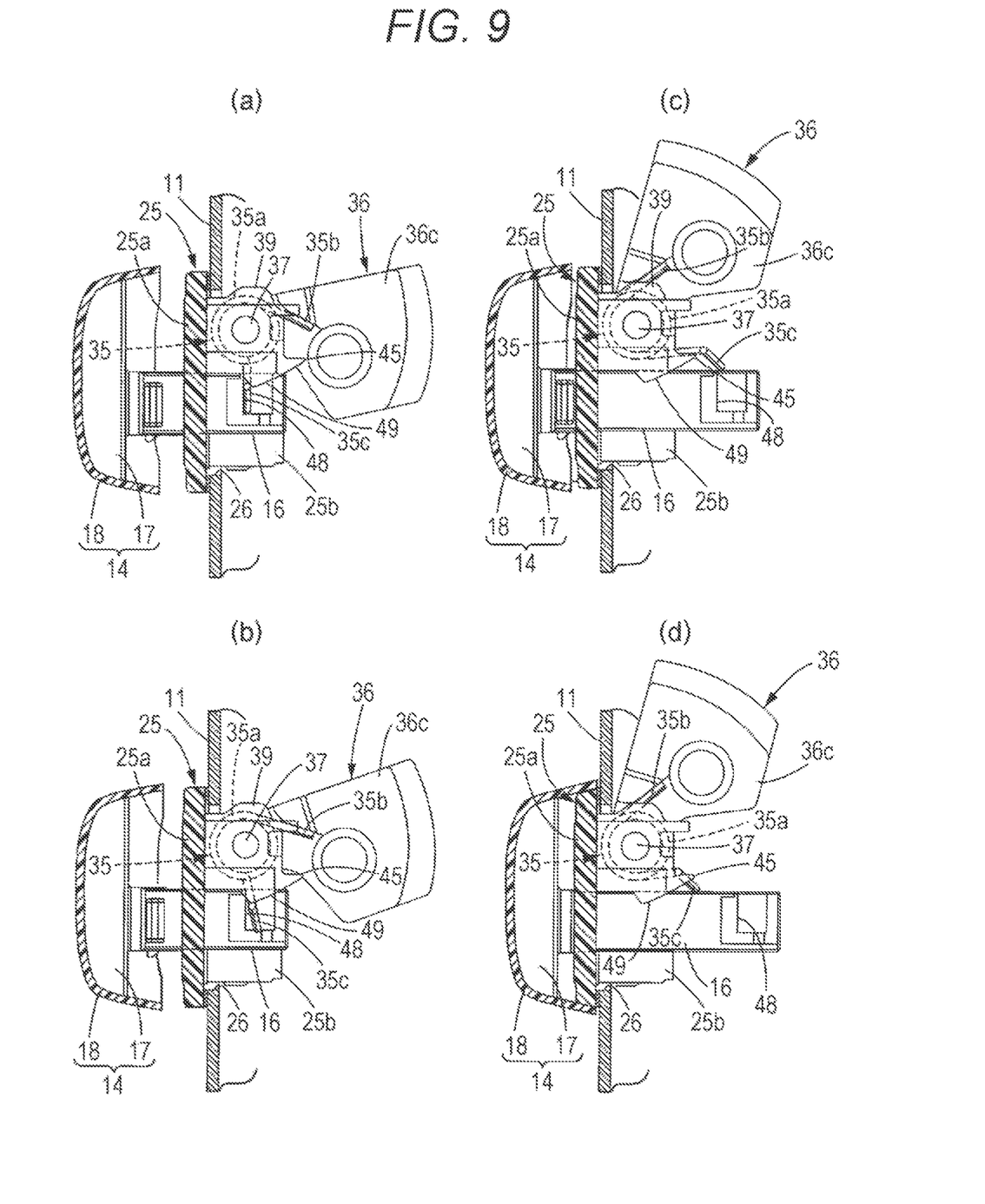
FIG. 9 is a cross-sectional view corresponding to FIG. 7 for sequentially illustrating a state change of the return spring in association with movement of the connecting arm portion when the handle base is assembled to the vehicle door.

In FIG. 9, when the base main portion 25a of the handle base 25 is attached to the outer panel 11, while the second engaging portion 35c of the return spring 35 is not engaged with the spring locking portion 45, and the connecting arm portion 16 is in the door opening operation position, as shown in FIG. 9(a), the pressing contact portion 48 of the connecting arm portion 16 is in contact with the second engaging portion 35c. From this state, when the outer handle 12 is operated in order to move the connecting arm portion 16 to the non-operating position side, as shown in FIG. 9(b), the second engaging portion 35c rides on the cam portion 49 on the handle base 25 side. Further, when the connecting arm portion 16 is moved to the non-operating position side, as shown in FIG. 9(c), the second engaging portion 35c guided by the cam portion 49 gets over the spring locking portion 45. Eventually, as shown in FIG. 9(d), the second engaging portion 35c gets over the spring locking portion 45 and engages with the spring locking portion 45. In this state, the return spring 35 exerts an elastic force, and the handle lever 36 is in the non-operation position.

Next, an operation of this embodiment will be described. The return spring 35, that has the first engaging portion 35b and the second engaging portion 35c at both ends thereof and causes the first engaging portion 35b to be in contact with and engaged with the handle lever 36, is attached to the handle lever 36 so as to be able to switch between a state in which when the handle base 25 is assembled to the vehicle door D, in a temporary holding state in which the connecting arm portion 16 of the outer handle 12 inserted into the opening 26 of the outer panel 11 is placed in the door opening operation position, the second engaging portion 35c is not engaged with the spring locking portion 45 of the handle base 25, and a state in which after assembly of the handle base 25 to the vehicle door D is completed, the second engaging portion 35c is in contact with and engaged with the spring locking portion 45.

Therefore, before assembling the handle base 25, to which the handle lever 36 that is interlocked with and connected to the connecting arm portion 16 inserted into the insertion hole 29 of the handle base 25 is assembled, to the vehicle door D, while the second engaging portion 35c of the return spring 35, that is in a state in which the first engaging portion 35b is engaged with the handle lever 36, is not engaged with the spring locking portion 45 of the handle base 25, by obtaining the temporary holding state in which the connecting arm portion 16 is placed in the door opening operation position, the handle lever 36 in a state in which a spring force of the return spring 35 does not act can be moved to the operating position to easily insert the handle lever 36 into the opening 26 of the outer panel 11, and the work of assembling the outer handle 12 to the vehicle door D can be easy. Further, since the outer handle 12 itself, that is susceptible to the impact, is not engaged, the temporary holding state is not easily released. Furthermore, no dedicated parts are required for temporarily holding the handle lever 36, and an increase in the number of parts can be avoided.

The handle lever 36 is provided with the cylindrical support tube portion 35a through which the support shaft 37 that rotatably supports the handle lever 36 on the handle base is inserted, the return spring is the torsion spring having the coil portion 35a that surrounds the support tube portion 35a, the first engaging portion 35b that is provided at one end of the coil portion 35a and is in contact with and engaged with the handle lever 36, and the second engaging portion 35c, that can be in contact with and engaged with the spring locking portion 45 provided on the handle base 25, and is provided at the other end of the coil portion 35a, the pressing contact portion 48, that can be in contact with the second engaging portion 35c not engaged with the spring locking portion 45, is provided in the connecting arm portion 16 so as to be able to press the second engaging portion 35c toward the spring locking portion 45 in response to the movement of the connecting arm portion 16 from the door opening operation position to the non-operation position, and the handle base 25 is provided with the cam portion 49 that guides the second engaging portion 35c toward the spring locking portion 45 in association with the movement of the connecting arm portion 16 from the door opening operation position to the non-operation position.

Therefore, when the second engaging portion 35c of the return spring 35 is in an unengaged state with the spring locking portion 45, by moving the connecting arm portion 16 from the door opening operation position to the non-operation position, the pressing contact portion 48 of the connecting arm portion 16 contacts the second engaging portion 35c and presses the second engaging portion 35c toward the spring locking portion 45 of the handle base 25. At that time, the second engaging portion 35c is guided toward the spring locking portion 45 by the cam portion 49 of the handle base 25. Thus, the second engaging portion 35c can be brought into contact with and engaged with the spring locking portion 45 simply by moving the connecting arm portion 16 from the door opening operation position to the non-operation position. Therefore, the work of contacting and engaging the second engaging portion 35c with the spring locking portion 45 is easy. Further, even if the connecting arm portion 16 is slightly pushed from the door opening operation position toward the non-operation position by the impact or the vibration during the transportation, unless the connecting arm portion 16 moves to the non-operation position, the second engaging portion 35c of the return spring 35 is engaged with the spring locking portion 45 of the handle base 25, and the handle lever 36 does not rotate to the non-operating position. Therefore, a possibility that the temporary holding state of holding the handle lever 36 in the operating position side is released can be suppressed to a low level.

The embodiments of the present invention have been described above. However, the present invention is not limited to the above embodiments. It is possible to make various design changes without departing from the present invention described in claims.

LIST OF REFERENCE NUMERALS

11: outer panel, 12: outer handle, 16: connecting arm portion, 25: handle base, 26: opening, 29: insertion hole, 35: return spring, 35a: coil portion, 35b: first engaging portion, 35c: second engaging portion, 36: handle lever, 36a: support tube portion, 37: support shaft, 45: spring locking portion, 48: pressing contact portion, 49: cam portion, D: vehicle door.

The invention claimed is:

1. A vehicular door outer handle device that is configured such that
   an opening (26) is provided in an outer panel (11) of a vehicle door (D),
   a handle base (25) having an insertion hole (29) is fixed to the vehicle door (D) so as to close the opening (26), while a part of the handle base (25) is inserted into the outer panel (11) from the opening (26),
   a connecting arm portion (16) provided on an outer handle (12) that allows a door opening operation on the outside of the outer panel (11) is inserted into the insertion hole (29) of the handle base (25) so as to be able to move between a non-operation position in a non-operation state of the outer handle (12) and a door opening operation position in a door opening operation completed state of the outer handle (12),
   a handle lever (36) that is interlocked with and connected to the connecting arm portion (16) is supported by the handle base (25) so that the handle lever (36) is rotatable between a non-operating position corresponding to the non-operation position of the connecting arm portion (16) and an operating position corresponding to the door opening operation position of the connecting arm portion (16),
   a return spring (35), that is interposed between the handle base (25) and the handle lever (36) and elastically urges the handle lever (36) toward the non-operating position, is attached to the handle lever (36), and
   when the handle base (25), to which the handle lever (36) that is interlocked with and connected to the connecting arm portion (16) is assembled, is assembled to the vehicle door (D), insertion of the handle lever (36) into the opening (26) is not allowed in a state of the non-operating position, but is allowed in a state of the operating position, wherein
   the return spring (35), that has a first engaging portion (35b) and a second engaging portion (35c) at both ends of the return spring (35) and causes the first engaging portion (35b) to be in contact with and engaged with the handle lever (36), is attached to the handle lever (36) so as to be able to switch between a state in which when the handle base (25) is assembled to the vehicle door (D), in a temporary holding state in which the connecting arm portion (16) inserted into the opening (26) is placed in the door opening operation position, the second engaging portion (35c) is not engaged with the handle base (25), and a state in which after assembly of the handle base (25) to the vehicle door (D) is completed, the second engaging portion (35*c*) is in contact with and engaged with the handle base (25).

2. The vehicular door outer handle device according to claim 1, wherein the handle lever (36) is provided with a cylindrical support tube portion (36*a*) through which a support shaft (37) that rotatably supports the handle lever (36) on the handle base (25) is inserted, the return spring (35) is a torsion spring having a coil portion (35*a*) that surrounds the support tube portion (35*a*), a first engaging portion (35*b*) that is provided at one end of the coil portion (35*a*) and is in contact with and engaged with the handle lever (36), and a second engaging portion (35*c*), that makes in contact with and engaged with a spring locking portion (45) provided on the handle base (25), and is provided at the other end of the coil portion (35*a*), a pressing contact portion (48), that makes in contact with the second engaging portion (35*c*) not engaged with the spring locking portion (45), is provided in the connecting arm portion (16) so as to be able to press the second engaging portion (35*c*) toward the spring locking portion (45) in response to movement of the connecting arm portion (16) from the door opening operation position to the non-operation position, and the handle base (25) is provided with a cam portion (49) that guides the second engaging portion (35*c*) toward the spring locking portion (45) in association with the movement of the connecting arm portion (16) from the door opening operation position to the non-operation position.

\* \* \* \* \*